US011426662B2

(12) United States Patent
Leland et al.

(10) Patent No.: US 11,426,662 B2
(45) Date of Patent: Aug. 30, 2022

(54) SYSTEM AND METHOD OF DETERMINING AT LEAST ONE INFORMATION HANDLING SYSTEM FOR A GAME

(71) Applicant: Dell Products L.P., Round Rock, TX (US)

(72) Inventors: Jake Mitchell Leland, Round Rock, TX (US); Tyler Ryan Cox, Austin, TX (US); Ryan Nicholas Comer, Pflugerville, TX (US); Marc Randall Hammons, Round Rock, TX (US); Richard William Schuckle, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/148,981

(22) Filed: Jan. 14, 2021

(65) Prior Publication Data

US 2022/0219083 A1 Jul. 14, 2022

(51) Int. Cl.
*A63F 13/77* (2014.01)
*A63F 13/85* (2014.01)
*A63F 13/58* (2014.01)
*A63F 13/35* (2014.01)

(52) U.S. Cl.
CPC .............. *A63F 13/58* (2014.09); *A63F 13/35* (2014.09); *A63F 13/77* (2014.09); *A63F 13/85* (2014.09)

(58) Field of Classification Search
None
See application file for complete search history.

(56) References Cited

U.S. PATENT DOCUMENTS

| | | | |
|---|---|---|---|
| 2004/0268341 A1* | 12/2004 | Kenworthy | G06F 11/302 717/174 |
| 2017/0118101 A1* | 4/2017 | Veron | H04L 41/5038 |
| 2021/0058468 A1* | 2/2021 | Yu | H04L 67/18 |

OTHER PUBLICATIONS

"You Can run it", System Requirements Lab via Wayback Machine Internet Archive, https://web.archive.org/web/20200110111413/ https://www.systemrequirementslab.com/cyri/, Jan. 10, 2020 (Year: 2020).*

* cited by examiner

*Primary Examiner* — Damon J Pierce
(74) *Attorney, Agent, or Firm* — Baker Botts, L.L.P.

(57) ABSTRACT

In one or more embodiments, one or more systems, one or more methods, and/or one or more processes may receive, from a user, first user input that indicates a selection of a game; may determine one or more numerical values respectively associated with one or more attributes associated with the game; may determine multiple numerical experience scores associated with multiple information handling systems operable for the user to play the game; may rank the multiple information handling systems by respective numerical experience scores; and may recommend at least one of the multiple information handling systems to the user based at least on ranking the multiple information handling systems by respective numerical experience scores and based at least on the one or more numerical values respectively associated with the one or more attributes associated with the game.

20 Claims, 7 Drawing Sheets

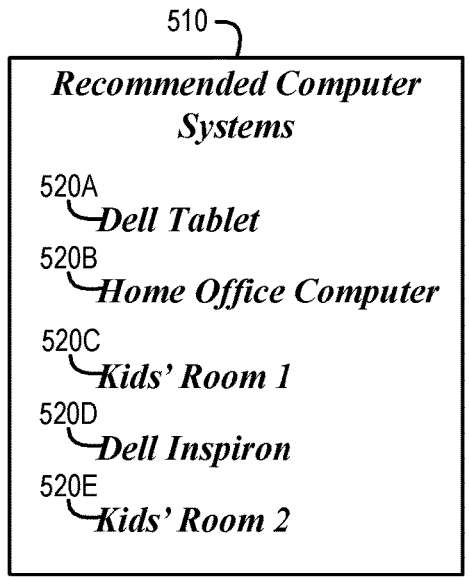
FIG. 5A
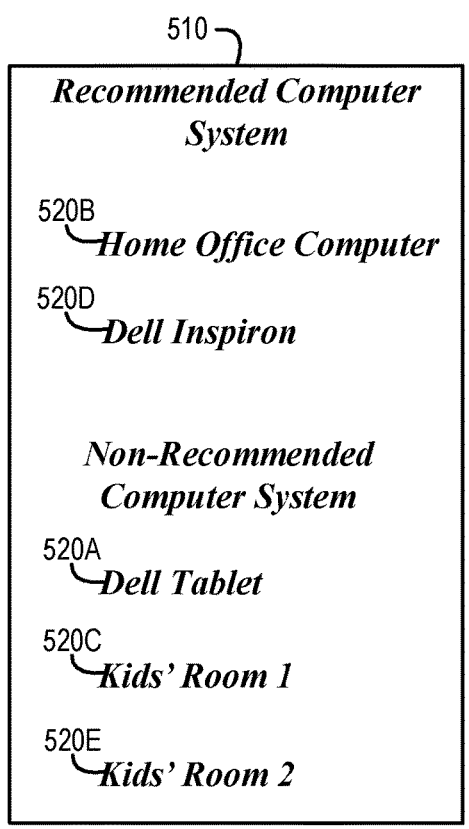
FIG. 5B
FIG. 5C

SYSTEM AND METHOD OF DETERMINING AT LEAST ONE INFORMATION HANDLING SYSTEM FOR A GAME

BACKGROUND

Field of the Disclosure

This disclosure relates generally to information handling systems and more particularly to determining at least one information handling system for a game.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may receive, from a user, first user input that indicates a selection of a game; may determine one or more numerical values respectively associated with one or more attributes associated with the game; may determine multiple numerical experience scores associated with multiple information handling systems operable for the user to play the game; may rank the multiple information handling systems by respective numerical experience scores; and may recommend at least one of the multiple information handling systems to the user based at least on ranking the multiple information handling systems by the respective numerical experience scores. In one or more embodiments, the one or more numerical values respectively associated with the one or more attributes associated with the game may include at least one of a minimum numerical processor throughput value, a minimum numerical bandwidth value, a minimum numerical graphic processor unit throughput value, and a numerical value associated with a graphics intensity of the game, among others.

In one or more embodiments, to determine the multiple numerical experience scores, the one or more systems, the one or more methods, and/or the one or more processes, for each information handling system of the multiple information handling systems, may further: determine a numerical hardware score based at least on components of the information handling system and based at least on utilization of the components of the information handling system; determine a numerical network score based at least on available data bandwidth and based at least on a bandwidth history at a location of the information handling system; determine a numerical preference score based at least on historical user preferences and based at least on location-based historical user preferences; and determine a numerical experience score for the information handling system based at least on the numerical hardware score, the numerical network score, and the numerical preference score.

In one or more embodiments, the one or more methods, and/or the one or more processes, may further: receive, from the user, second user input that indicates a selection of a selected information handling system of the multiple information handling systems; and record the second user input that indicates the selection of the selected information handling system. In one or more embodiments, to determine the numerical hardware score, the one or more methods, and/or the one or more processes, may further: determine a first numerical value associated with an estimate of a performance of the game on the information handling system based at least on components of the information handling system; and determine a second numerical value associated with the performance of the game on the information handling system based at least on utilization of the components of the information handling system.

In one or more embodiments, to determine the numerical network score, the one or more methods, and/or the one or more processes, may further: determine a third numerical value associated with an ability to stream data based at least on available data bandwidth; and determine a fourth numerical value associated with the ability to stream the data based at least on a history at the location of the information handling system. In one or more embodiments, to determine the numerical preference score, the one or more methods, and/or the one or more processes, may further: determine a fifth numerical value associated with a user preference based at least on a history associated with the user and determine a sixth numerical value associated with a user preference based at least on a history associated with the user at a location of the user.

In one or more embodiments, the numerical hardware score may be based at least on the first numerical value and based at least on the second numerical value, the numerical network score may be based at least on the third numerical value and based at least on the fourth numerical value, and the numerical preference score may be based at least on the fifth numerical value and based at least on the sixth numerical value. In one or more embodiments, the location of the information handling system may include a physical location of the information handling system. In one or more embodiments, the location of the information handling system may include a network location of the information handling system. In one or more embodiments, the multiple information handling systems may include at least one of a desktop computer system, a laptop computer system, a tablet computing device, a personal digital assistant, a gaming console, an electronic music player, an electronic video player, and a wireless telephone, among others.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which:

FIGS. 5A-5C illustrate examples of a graphical user interface displaying recommended information handling systems, according to one or more embodiments.

DETAILED DESCRIPTION

Figure 1:
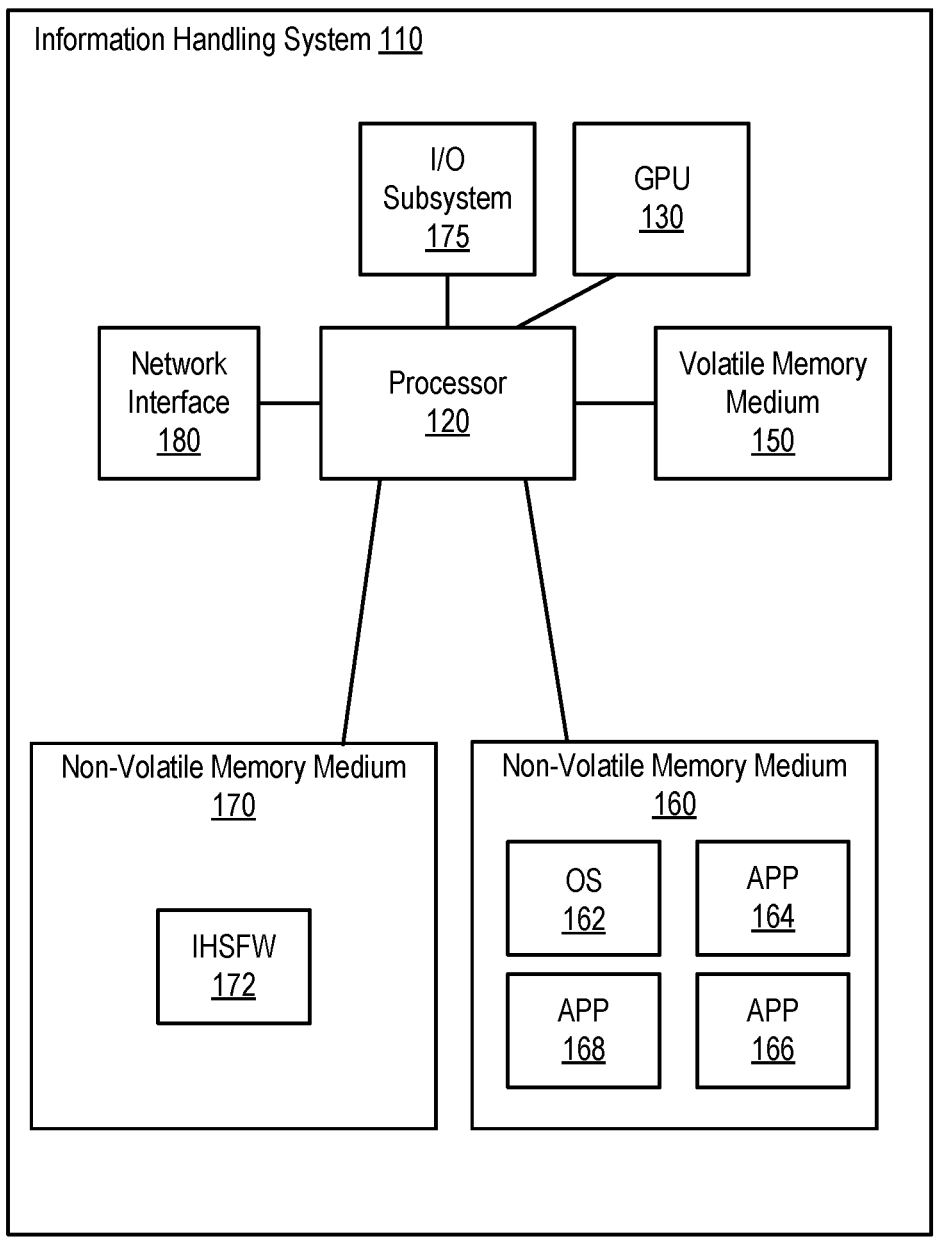
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, streaming technology may enable game streaming between devices on a local network. For example, a game running on a powerful gaming information handling system (e.g., a desktop information handling system) may be streamed to a lightweight information handling system (e.g., a laptop information handling system, a tablet information handling system, a wireless telephone information handling system, etc.) for more convenient gaming on a couch or another location. In one instance, a user may manually identify an information handling system from which to stream. In another instance, a system may recommend an information handling system from which to stream. As an example, the system may recommend an information handling system for a particular type of game play that would be of value to the user.

In one or more embodiments, one or more systems, one or more methods, and/or one or more processes may score a per-game expected experience based at least on hardware components of a candidate information handling system, one or more network conditions associated with the candidate information handling systems, and/or one or more historical user preferences, among others. For example, the one or more systems, the one or more methods, and/or the one or more processes may recommend one or more specific information handling systems to run a game based at least on respective one or more experience scores.

In one or more embodiments, the one or more systems, the one or more methods, and/or the one or more processes may have access to system telemetry, which may include information associated with hardware resources (e.g. processor, graphics processing unit, random access memory, etc.). When a user wants to play a game on a client information handling system, the one or more systems, the one or more methods, and/or the one or more processes may survey multiple information handling systems and may compare each information handling system of the multiple information handling systems with a global information handling system experience model, adjusting for current available resources (e.g. component utilization, power availability, etc.), and may generate a hardware experience score.

In one or more embodiments, the one or more systems, the one or more methods, and/or the one or more processes may survey a network performance between each potential information handling system and the client information handling system, considering historical network entropy and/or performance at a current information handling system location to generate a network experience score. In one or more embodiments, the one or more systems, the one or more methods, and/or the one or more processes may record a record of a user's information handling system selection per-game, which may be utilized in generating a preference score. In one or more embodiments, a weighted combination of the performance score, the network score, and the preference score may yield an overall experience score, which may indicate an expected quality of streamed game play. For example, this score may be utilized to rank the user's potential host information handling systems, recommend an information handling system with a highest score, and/or recommend multiple information handling systems associated with scores that meet or exceed a threshold score.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, a gaming console, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I²C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a graphics processing unit (GPU) 130, a volatile memory medium 150, non-volatile memory media 160 and 170, an I/O subsystem 175, and a network interface 180. As illustrated, GPU 130, volatile memory medium 150, non-volatile memory media 160 and 170, I/O subsystem 175, and network interface 180 may be communicatively coupled to processor 120.

In one or more embodiments, one or more of GPU 130, volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of GPU 130, volatile memory medium 150, non-volatile memory media 160 and 170, I/O subsystem 175, and network interface 180 may be communicatively coupled to processor 120 via one or more PCI-Express (PCIe) root complexes. In another example, one or more of I/O subsystem 175 and network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems (IHSs). In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

Figure 2A:
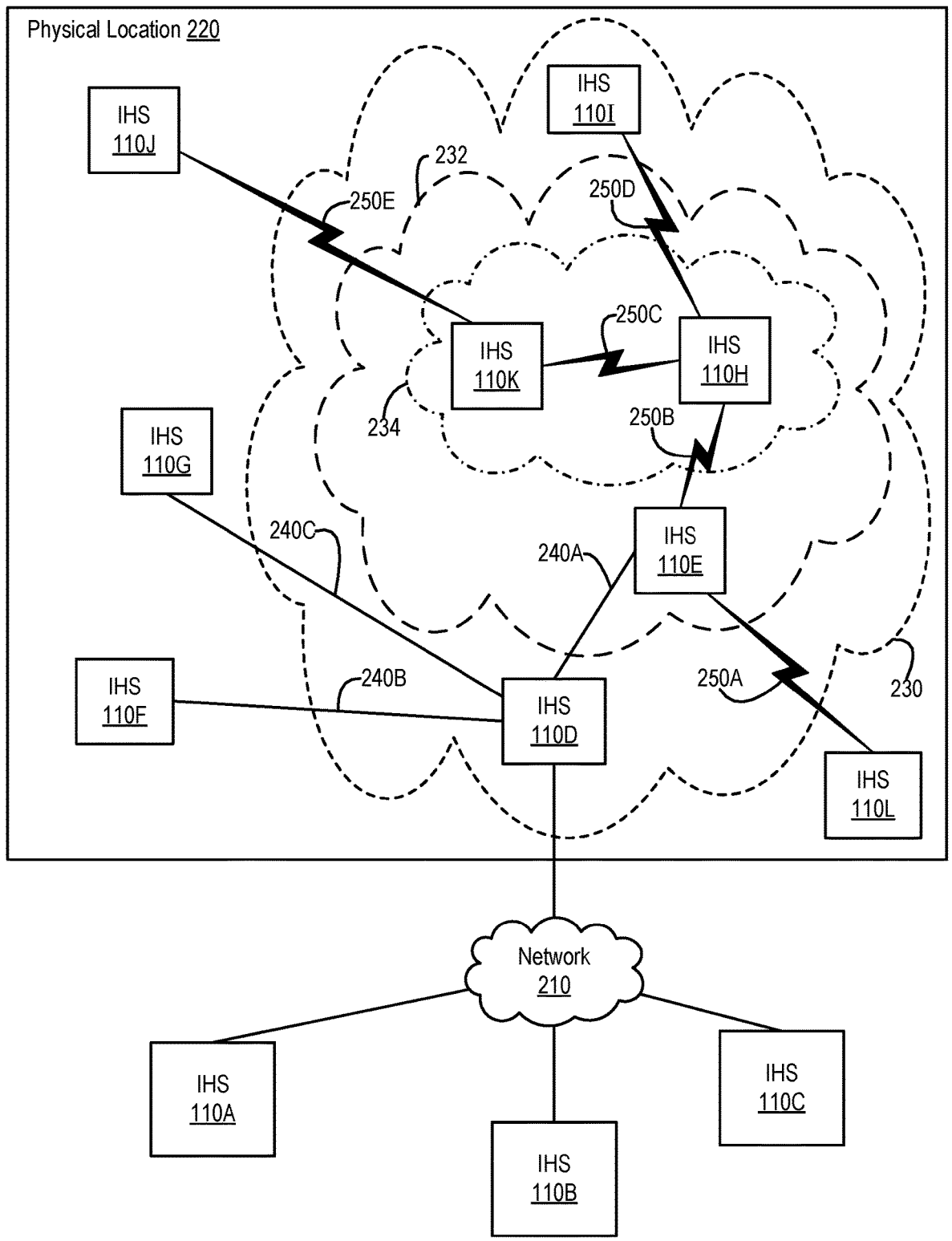
FIG. 2A illustrates an example of information handling systems at a physical location, according to one or more embodiments.

Turning now to FIG. 2A, an example of information handling systems at a physical location is illustrated, according to one or more embodiments. As shown, IHSs 110A-110C may be coupled to a network 210. In one or more embodiments, network 210 may include a wired network, a wireless network, an optical network, or a combination of the foregoing, among others. For example, network 210 may include and/or be coupled to various types of communications networks. For instance, network 210 may include and/or be coupled to a LAN, a WAN (e.g., a private WAN, a corporate WAN, a public WAN, etc.), an Internet, a public switched telephone network (PSTN), a cellular telephone network, a satellite telephone network, or a combination of the foregoing, among others.

In one or more embodiments, one or more of IHSs 110A-110L may host one or more games. For example, a game may include one or more of an action game, an adventure game, a role-playing game, a board game, a strategy game, a simulation game, a puzzle game, a sports game, an educational game, a virtual reality (VR) game, an augmented reality (AR) game, a skill building game, a training game, and a multiplayer game, among others.

As illustrated, IHSs 110D-110L may be at a physical location 220. In one or more embodiments, a structure (e.g., a building, a home, etc.) may include physical location 220. For example, physical location 220 one or more areas and/or one or more volumes. For instance, physical location 220 may include one or more portions of a building, one or more portions of an apartment, one or more portions of a condominium, and/or one or more portions of a home, among others. As shown, IHS 110D may be coupled to network 210. In one example, IHS 110D may be coupled to network 210 in a wired fashion. In another example, IHS 110D may be coupled to network 210 in a wireless fashion. In one or more embodiments, IHS 110D may be or include a network router, a modem, a network switch, and/or a network hub. In one or more embodiments, IHS 110D may implement a network 230. For example, network 230 may include a LAN.

In one or more embodiments, IHSs 110E-110L may be communicatively coupled to IHS 110D. In one example, IHSs 110E, 110F, and 110G may be coupled to IHS 110D via respective couplings 240A-240C. In one instance, a coupling 240 may include a wired coupling (e.g., wired Ethernet). In another instance, a coupling 240 may include an optical coupling (e.g., fiber optics cable). In a second example, IHSs 110H and 110L may be coupled to IHS 110E via respective radio frequency (RF) signals 250A and 250B. For instance, IHS 110E may be or include a wireless access point, which may implement a wireless network 232. In a third example, IHSs 110I and 110K may be coupled to IHS 110H via respective RF signals 250D and 250C. For instance, IHSs 110H and 110K may implement a wireless mesh network 234. In another example, IHS 110J may be coupled to IHS 110K via RF signals 250E. In one or more embodiments, network 230 may include network 232. In one or more embodiments, network 232 may include network 234.

Figure 2B:
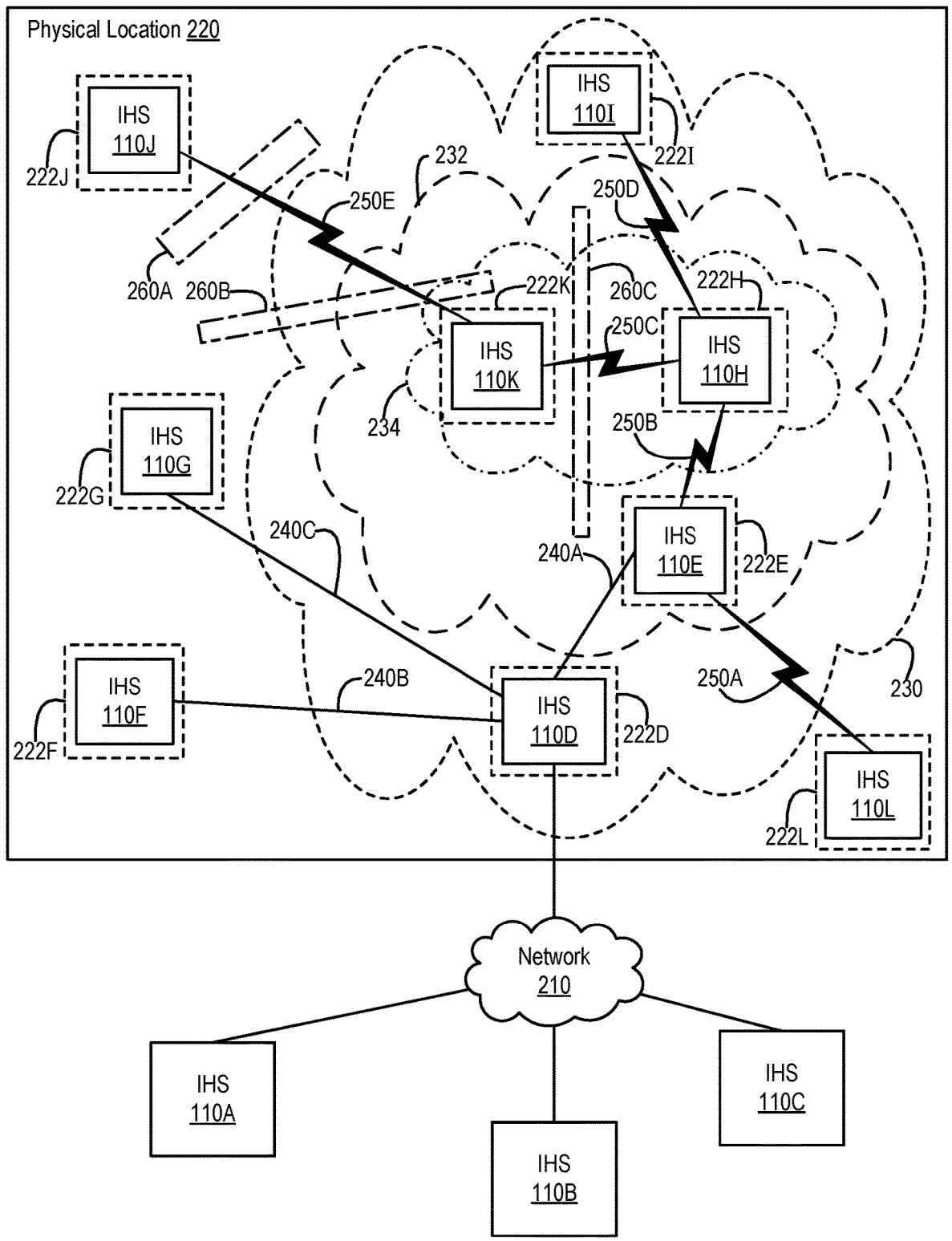
FIG. 2B illustrates an example of information handling systems at physical locations, according to one or more embodiments.

Turning now to FIG. 2B, an example of information handling systems at physical locations is illustrated, according to one or more embodiments. As shown, IHSs 110D-110L may be at respective physical locations 222D-222L. For example, physical location 220 may include physical locations 222D-222L. In one or more embodiments, a physical location 222 may be associated with coordinates. For example, the coordinates may be associated with multiple dimensions. In one instance, the multiple dimensions may include two dimensions. In another example, the multiple dimensions may include three dimensions. In one or more embodiments, a physical location 222 may be associated a chamber (e.g., a room, an office, etc.) of a structure. In one or more embodiments, a physical location 222 may be associated a porch and/or a balcony of a structure. In one or more embodiments, the structure may include one or more physical barriers. For example, the one or more physical barriers may include one or more walls, one or more pillars, one or more ceilings, one or more appliances (e.g., one or more household appliances, one or more office appliances, etc.), one or more doors, and one or more windows, among others.

As illustrated, physical location 220 may include physical barriers 260A-260C. In one or more embodiments, a barrier 260 may attenuate or block RF signals 250. In one example, physical barriers 260A and 260B may attenuate or block RF signals 250E. For instance, if one or more of physical barriers 260A and 260B block RF signals 250E, RF signals 250E may be retransmitted. In another example, physical barrier 260C may attenuate or block RF signals 250C. For instance, if physical barrier 260C blocks RF signals 250C, RF signals 250C may be retransmitted. In one or more embodiments, RF signals 250 may represent one-way or two-way wireless communications between two IHSs 110.

Figure 2C:
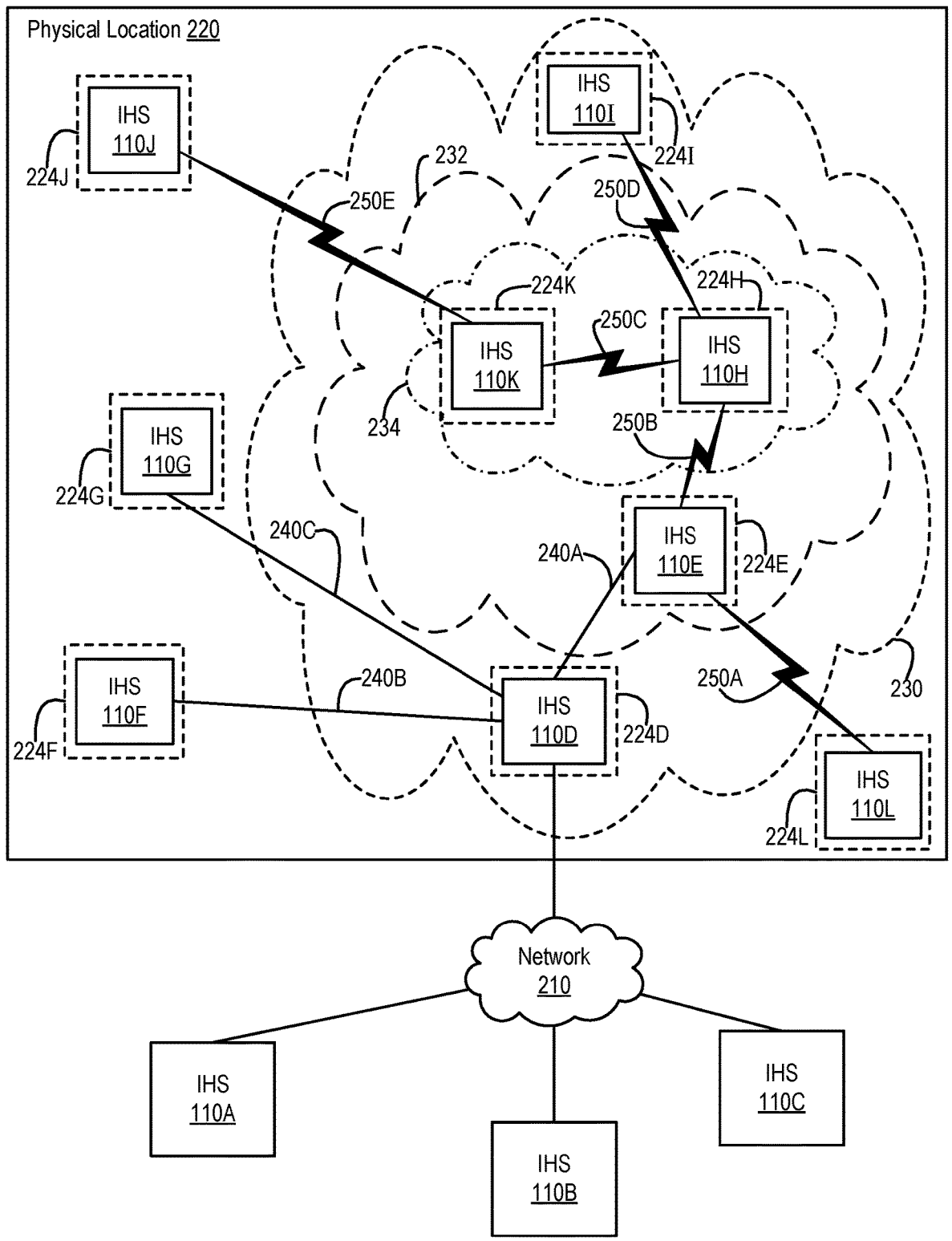
FIG. 2C illustrates an example of information handling systems at network locations, according to one or more embodiments.

Turning now to FIG. 2C, an example of information handling systems at network locations is illustrated, according to one or more embodiments. As shown, IHSs 110D-110L may be at respective network locations 224D-224L. In one or more embodiments, a network location 224 may include a number of network hops to a network router. For example, a network location 224 may include a number of network hops to IHS 110D. In one or more embodiments, a network hop may include a network node. As an example, a network node may include an IHS 110. In one instance, IHS 110J may have network hops of IHS 110K, IHS 110H, and IHS 110E to IHS 110D. In a second instance, IHS 110L may have a network hop of IHS 110E to IHS 110D. In another instance, IHS 110G may not have any network hops to IHS 110D. In one or more embodiments, a network location 224 may include one or more communication couplings to a network router. For example, a network location 224 may include one or more communication couplings to IHS 110D. In one or more embodiments, a network location 224 may include a type of coupling to a network router. In one example, a type of coupling to a network router may include a wireless coupling. In another example, a type of coupling to a network router may include a wired coupling (e.g., wired Ethernet, fiber optic cabling, etc.).

Figure 3:
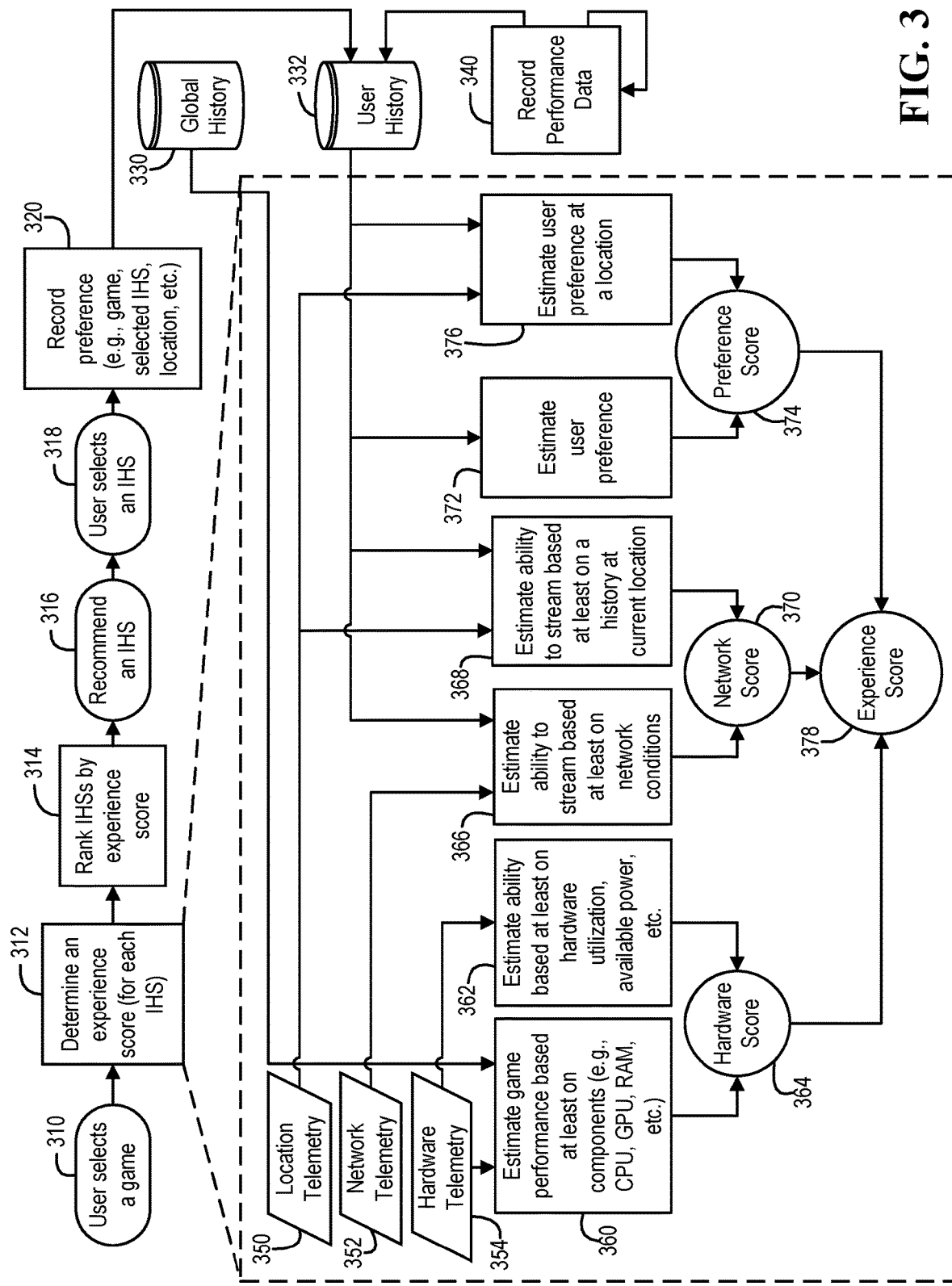
FIG. 3 illustrates an example of a method of determining a recommendation for an information handling system, according to one or more embodiments.

Turning now to FIG. 3, an example of a method of determining a recommendation for an information handling system is illustrated, according to one or more embodiments. At 310, a user may select a game. For example, a user may select which game the user wants to play. For instance, an IHS 110 may receive user input, which may indicate a game.

In one or more embodiments, one or more factors may be associated with a game. In one example, a first factor associated with the game may be associated with a performance of IHS 110. For instance, the first factor may be associated with one or more of a performance of processor 120 and a performance of GPU 130, among others. In a second example, a second factor associated with the game may be associated with a latency. In one instance, the latency may be associated with a network latency. In another instance, the latency may be associated with a latency between output (e.g., streaming media to the user) and user input. In a third example, a third factor associated with the game may include a history associated with the user. For instance, the history associated with the user may include past utilization of the game by the user. In another example, a fourth factor associated with the game may include histories respectively associated with multiple users. For instance, the histories respectively associated with the multiple users may include past utilization of the game by the multiple users.

In one or more embodiments, a data structure may store numerically scored attributes associated with the game. For example, the numerically scored attributes may be associated with the one or more factors with the game. For instance, the one or more factors with the game may be determined based at least on the numerically scored attributes associated with the game. In one or more embodiments, at 340, performance data may be recorded. For example, performance data may be recorded for each of the information handling systems where a game was played. In one instance, data associated with performance of the game with one or more components of one or more IHSs 110 may be recorded. In another instance, data associated with performance of the game with one or more associated networks (e.g., one or more of networks 230-234) may be recorded. In one or more embodiments, network conditions may change over time. For example, the data associated with performance of the game with the one or more associated networks may be sampled at various times as the game is being played and recorded. For instance, the data associated with performance of the game with the one or more associated networks may be recorded at various times and/or periodically as the game is being played. At 360, game performance may be estimated based at least on a global history 330 and/or based at least on hardware telemetry 354.

In one or more embodiments, global history 330 may include histories associated with past utilizations of multiple games by multiple users. In one or more embodiments, hardware telemetry 354 may include information associated with one or more components of an IHS 110. For example, one or more components of IHS 110 may include one or more of processor 120, GPU 130, volatile memory medium 150, non-volatile memory medium 160, non-volatile memory medium 170, I/O subsystem 175, and network interface 180.

In one or more embodiments, estimating game performance based at least on global history 330 and/or based at least on hardware telemetry 354 may include determining one or more numerical values associated with a game based at least on global history 330 and/or based at least on hardware telemetry 354. As an example, the one or more numerical values associated with the game may indicate how much potential or headroom is available for the game. For instance, the one or more numerical values associated with the game may indicate an amount of headroom that may be available for the game for processor utilization, GPU utilization, and/or memory medium utilization, among others. In one or more embodiments, the one or more numerical values may include a single numerical value associated with the game based at least on the one or more components of IHS 110. In one or more embodiments, the one or more numerical values may include a vector of numerical values associated with the game based at least on the one or more components of IHS 110.

At 362, game performance may be estimated based at least hardware telemetry 354. For example, hardware telemetry 354 may include information associated with electrical power available to IHS 110. In one instance, IHS 110 may include one or more batteries. Electrical power available to IHS 110 may be based at least on how much energy is stored by the one or more batteries. In another instance, IHS 110 may receive electrical power from a power adapter. Electrical power available to IHS 110 may be based at least on how much power can be provided by the power adapter.

In one or more embodiments, estimating game performance based at least on the electrical power available to IHS 110 may include determining one or more numerical values associated with a game based at least on the electrical power available to IHS 110. For example, the one or more numerical values associated with the game may indicate how much electrical energy or electrical power headroom is available for the game. For instance, the one or more numerical values associated with the game may indicate an amount of electrical power headroom that may be available for processor utilization, GPU utilization, and/or memory medium utilization, among others.

At 364, a hardware score may be determined. For example, the hardware score may be determined based at least on the one or more numerical values from 360 and based at least on the one or more numerical values from 362. For instance, the hardware score may include a numerical value. At 366, an ability to stream media may be estimated based at least on network telemetry 352 and/or based at least on user history 332. For example, network telemetry 352 may include information that indicates network conditions. In one or more embodiments, estimating an ability to stream media estimated based at least on network conditions may include determining one or more numerical values associated with network conditions. In one or more embodiments, network conditions may include an amount of network traffic (e.g., network data) a network node (e.g., a network switch, a network router, a wireless access point, a wireless mesh element, etc.) is handling. For example, the one or more numerical values associated with network conditions may indicate how much data bandwidth is available to stream media and/or other data associated with a game. In one instance, the one or more numerical values associated with network conditions may indicate an amount of bits per second is available for data associated with the game. In another instance, the one or more numerical values associated with network conditions may indicate an amount of latency associated with one or more network nodes. In one or more embodiments, one or more of IHSs 110D, 110E, 110H, and 110H may be, may function as, and/or may implement one or more network nodes.

In one or more embodiments, user history 332 may include information that indicates which network nodes an information handling system associated with the user has been utilized in the past. In one example, the information handling system associated with the user may be have been utilized with a specific access point. In a second example, the information handling system associated with the user may be have been utilized with multiple access points of a wireless mesh network. In another example, the information handling system associated with the user may be have been utilized with one or more network switches and/or one or more network routers.

At 368, an ability to stream data may be estimated based at least on location telemetry 350 and/or based at least on user history 332. In one example, location telemetry 350 may include information indicating a physical location of an information handling system associated with a user. For instance, in wireless network communications, an ability to stream data may be the physical location of the information handling system. As one example, location telemetry 350 may include information indicating a distance between a wireless access point and the physical location of the information handling system. As another example, location telemetry 350 may include information indicating a RF signal attenuation and/or RF signal loss based at least on the physical location of the information handling system. For instance, one or more physical barriers may attenuate and/or block one or more RF signals between a wireless access point and the physical location of the information handling system. In another example, location telemetry 350 may include information indicating a network location of the information handling system associated with the user. In one instance, the network location of the information handling system may indicate a number of network nodes traversed to a router. In another instance, the network location of the information handling system may indicate where the information handling system is in relation to a wireless mesh network.

At 370, a network score may be determined. For example, the network score may be determined based at least on the one or more numerical values from 366 and based at least on the one or more numerical values from 368. For instance, the network score may include a numerical value. At 372, a user preference may be estimated based at least on user history 330. In one example, user history 330 may include one or more numerical values that may indicate when the user overrides a suggestion determined by a system. For instance, one or more numerical values that may indicate a percentage associated with user overriding a suggestion determined by the system. In one example, user history 330 may include one or more numerical values that may indicate one or more preferences of the user. For instance, the one or more preferences of the user may indicate one or more devices the user utilizes for one or more games and/or for one or more computing tasks, among others.

At 376, a user preference at a location (e.g., a physical location, a network location, etc.) may be estimated based at least on user history 330 and/or based at least on location telemetry 350. For example, an estimate associated with a user preference at a location may include one or more numerical values that may indicate an information handling system and location combination preference for a game. At 374, a preference score may be determined. For example, the preference score may be determined based at least on the one or more numerical values from 372 and based at least on the one or more numerical values from 376. For instance, the preference score may include a numerical value. At 378, an experience score may be determined. For example, the experience score may be determined based at least on the numerical value from hardware score 364, the numerical value from network score 370, and the numerical value from preference score 374. In one or more embodiments, an experience score may be determined for each information handling system that the user may utilize, at 312. For example, an experience score may be determined for each IHS 110 of IHSs 110E-110I (illustrated in FIG. 2).

At 314, the information handling systems, which the user may utilize, may be ranked by their respective experience scores. For example, IHSs 110E-110I may be ranked by their respective experience scores. For instance, a list of information handling systems may be displayed to the user. As an example, a list of identifiers, identifying IHSs 110E-110I, may be displayed to the user. At 316, one or more information handling systems may be recommended to the user. For example, one or more of IHSs 110E-110I may be recommended for utilization by the user. In one instance, a single IHS 110 of IHSs 110E-110I may be recommended for utilization by the user. In a second instance, a portion of IHSs 110E-110I may be recommended for utilization by the user. In another instance, all of IHSs 110E-110I may be recommended for utilization by the user. In one or more embodiments, the one or more of IHSs 110E-110I that may be recommended for utilization by the user may be associated with a minimum acceptable experience score for the user. In one example, multiple of IHSs 110E-110I may be recommended for utilization by the user may be associated with a minimum acceptable experience score for the user for a board game. In another example, one or two of IHSs 110E-110I may be recommended for utilization by the user may be associated with a minimum acceptable experience score for the user for a graphics-intensive AR and/or VR game.

At 318, the user may select an information handling system. For example, the user may select an IHS 110 of IHSs 110E-110I. In one instance, the selected information handling system may be the recommended information handling system. In another instance, the selected information handling system may not be the recommended information handling system. In one or more embodiments, user input, which may indicate a selected information handling system, may be received. At 320, a preference of the user may be recorded. For example, the preference of the user may be recorded in user history 332. In one or more embodiments, the preference of the user may include information indicating one or more of a specific game, a selected information handling system, and a location (e.g., a network location, a physical location, etc.), among others. In one or more embodiments, as more selections are received from the user, more accurate recommendations may be determined for the user based at least on information stored via user history 332.

Figure 4:
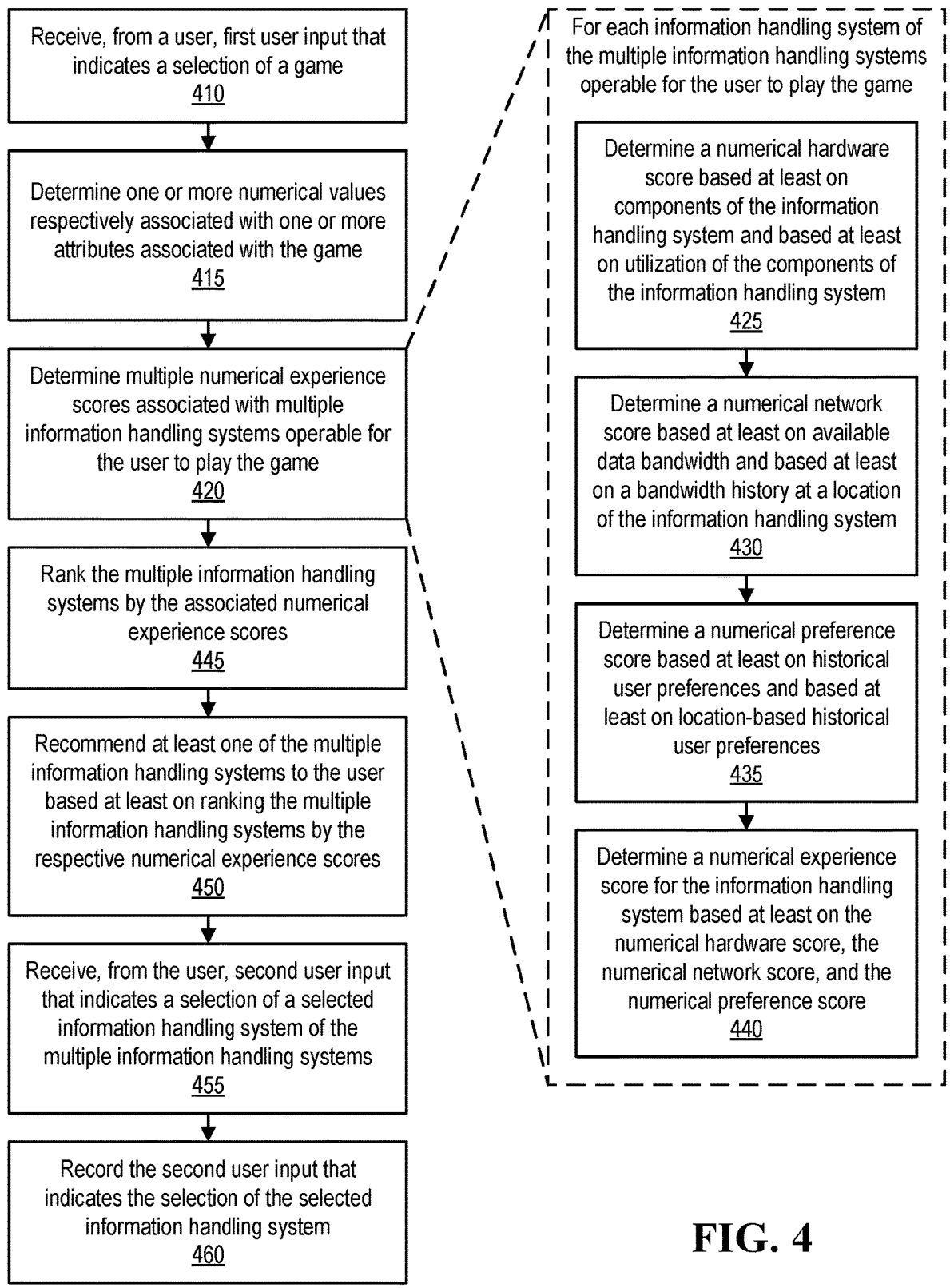
FIG. 4 illustrates another example of a method of determining a recommendation for an information handling system, according to one or more embodiment.

Turning now to FIG. 4, another example of a method of determining a recommendation for an information handling system is illustrated, according to one or more embodiment. At 410, first user input that indicates a selection of a game may be received from a user. For example, the first user input that indicates the selection of the game may be received from the user via a graphical user interface (GUI). In one instance, the GUI may include a web page. In a second instance, the GUI may include a web browser. In another instance, the GUI may include a native application. At 415, one or more numerical values respectively associated with one or more attributes associated with the game may be determined. In one or more embodiments, the one or more numerical values respectively associated with the one or more attributes associated with the game may include at least one of a minimum numerical processor throughput value, a minimum numerical bandwidth value, a minimum numerical graphic processor unit throughput value, and a numerical value associated with a graphics intensity of the game, among others.

At 420, multiple numerical experience scores associated with multiple information handling systems operable for the user to play the game may be determined. In one or more embodiments, determining multiple numerical experience scores associated with multiple information handling systems operable for the user to play the game may include performing method elements 425-440 for each information handling system of the multiple information handling systems operable for the user to play the game.

At 425, a numerical hardware score may be determined based at least on components of the information handling system and based at least on utilization of the components of the information handling system. In one or more embodiments, utilization of the components of the information handling system may include a workload being processed by the information handling system. For example, a numerical hardware score may be determined based at least on utilization of the components to process the workload. In one or more embodiments, utilization of the components of the information handling system may include a number of applications executing on the information handling system. For example, a favorable numerical hardware score may be inversely proportional to the number of applications executing on the information handling system. In one or more embodiments, utilization of the components of the information handling system may include one or more processor intensive applications and/or one or more GPU intensive applications executing on the information handling system. In one example, a processor intensive application may include a compiler compiling a kernel of an operating system. In a second example, a processor intensive application may include a compiler compiling an operating system. In third example, a processor intensive application and/or a GPU intensive application may include a video application producing a video. In another example, a processor intensive application and/or a GPU intensive application may include a video application converting a video from a first video format to a second video format. In one or more embodiments, determining the numerical hardware score may include determining a first numerical value associated with an estimate of a performance of the game on the information handling system based at least on components of the information handling system and determining a second numerical value associated with the performance of the game on the information handling system based at least on utilization of the components of the information handling system. In one or more embodiments, the first numerical value may be weighted by a first numerical weight. In one or more embodiments, the second numerical value may be weighted by a second numerical weight.

At 430, a numerical network score may be determined based at least on available data bandwidth and based at least on a bandwidth history at a location of the information handling system. In one example, the location of the information handling system may include a physical location. In a second example, the location of the information handling system may include a network location. In another example, the location of the information handling system may include a physical location and a network location. In one or more embodiments, bandwidth may include information that indicates an amount of data that can be transmitted per time unit via at least a portion of a network. For example, a bandwidth history may include one or more recorded information that indicates an amount of data transmitted per second via at least a portion of a network. In one or more embodiments, the determining the numerical network score may include determining a third numerical value associated with an ability to stream data based at least on available data bandwidth and determining a fourth numerical value associated with the ability to stream the data based at least on a history at the location of the information handling system. In one or more embodiments, the third numerical value may be weighted by a third numerical weight. In one or more embodiments, the fourth numerical value may be weighted by a fourth numerical weight.

At 435, a numerical preference score may be determined based at least on historical user preferences and based at least on location-based historical user preferences. In one or more embodiments, determining the numerical preference score may include determining a fifth numerical value associated with a user preference based at least on a history associated with the user and determining a sixth numerical value associated with a user preference based at least on a history associated with the user at a location of the user. In one or more embodiments, the fifth numerical value may be weighted by a fifth numerical weight. In one or more embodiments, the sixth numerical value may be weighted by a sixth numerical weight.

At 440, a numerical experience score for the information handling system may be determined based at least on the numerical hardware score, the numerical network score, and the numerical preference score. In one or more embodiments, determining the numerical experience score for the information handling system may be based at least on the first numerical value and based at least on the second numerical value, based at least on the third numerical value and based at least on the fourth numerical value, and based at least on the fifth numerical value and based at least on the sixth numerical value. For example, the numerical hardware score may be based at least on the first numerical value and based at least on the second numerical value, the numerical network score is based at least on the third numerical value and based at least on the fourth numerical value, and the numerical preference score is based at least on the fifth numerical value and based at least on the sixth numerical value.

At 445, the multiple information handling systems may be ranked by respective numerical experience scores. For example, a first numerical experience score associated with a first information handling system may be higher than a second numerical experience score associated with a second information handling system. For instance, a comparison of the first numerical experience score and the second numerical experience score may indicate that the first information handling system is better suited for the game (e.g., may provide a better user experience) than the second information handling system. As an example, the multiple information handling systems may be ranked by respective numerical experience scores from highest to lowest, where a higher the experience score indicates a better user experience.

At 450, at least one of the multiple information handling systems may be recommended to the user based at least on ranking the multiple information handling systems by the respective numerical experience scores and based at least on the one or more numerical values respectively associated with the one or more attributes associated with the game. In one example, a single information handling system of the multiple information handling systems may be recommended to the user. In one instance, the single information handling system of the multiple information handling systems recommended to the user may be ranked highest. In another instance, the single information handling system of the multiple information handling systems recommended to the user may be associated with a highest numerical experience score of the multiple numerical experience score respectively associated with the multiple information handling systems. In another example, two or more information handling systems of the multiple information handling systems may meet or exceed a threshold numerical experience score. In one instance, the two or more information handling systems of the multiple information handling systems that meet or exceed the threshold numerical experience score may be recommended. In another instance, the threshold numerical experience score may be determined based at least on the one or more numerical values respectively associated with the one or more attributes associated with the game. As an example, a minimum user experience level and/or score may be determined based at least on the one or more numerical values respectively associated with the one or more attributes associated with the game In one or more embodiments, recommending at least one of the multiple information handling systems to the user may include displaying, to the user, at least one identifier associated with the at least one of the multiple information handling systems via a display. For example, the at least one identifier associated with the at least one of the multiple information handling systems may be displayed via a GUI 510, illustrated in FIGS. 5A-5C. In one instance, GUI 510 may include a web page. In a second instance, GUI 510 may include a web browser. In another instance, GUI 510 may include a native application.

As shown in FIGS. 5A-5C, identifiers 520A-520E may be displayed by GUI 510. For example, identifiers 520A-520E may be respectively associated with IHSs 110F, 110G, 110I, 110J, and 110L. As illustrated in FIG. 5A, GUI 510 may display identifiers 520A-520E associated with recommended IHSs 110F, 110G, 110I, 110J, and 110L. For example, all of IHSS 110F, 110G, 110I, 110J, and 110L may be recommended. As shown in FIG. 5B, GUI 510 may display identifier 520B as recommended. For example, GUI 510 may display identifier 520B associated with recommended IHS 110G. For instance, a single recommended IHS may be IHS 110G. As illustrated in FIG. 5B, GUI 510 may display identifiers 520A and 520C-520E as not recommended. For example, identifiers 520A and 520C-520E may be respectively associated with non-recommended IHS 110F, 110I, 110J, and 110L. Even though identifiers 520A and 520C-520E may be respectively associated with non-recommended IHSs 110F, 110I, 110J, and 110L, the user may select one of identifiers 520A and 520C-520E respectively associated with non-recommended IHSs 110F, 110I, 110J, and 110L, for instance. As shown in FIG. 5C, GUI 510 may display identifiers 520B and 520D as recommended. For example, GUI 510 may display identifiers 520B and 520D associated with recommended IHSs 110G and 110J. As illustrated in FIG. 5C, GUI 510 may display identifiers 520A, 520C, and 520E as not recommended. For example, identifiers 520A, 520C, and 520E may be respectively associated with non-recommended IHSs 110F, 110I, and 110L. Even though identifiers 520A, 520C, and 520E may be respectively associated with non-recommended IHSs 110F, 110I, and 110L, the user may select one of identifiers 520A, 520C, and 520E respectively associated with non-recommended IHSs 110F, 110I, and 110L, for instance.

With reference again to FIG. 4, second user input that indicates a selection of a selected information handling system of the multiple information handling systems may be received from the user, at 455. For example, the second user input that indicates the selection of the selected information handling system of the multiple information handling systems may be received from the user via GUI 510. At 460, the second user input that indicates the selection of the selected information handling system may be recorded. For example, the second user input that indicates the selection of the selected information handling system may be recorded in user history 332. For instance, recording the second user input that indicates the selection of the selected information handling system may include storing the second user input that indicates the selection of the selected information handling system via user history 332. In one or more embodiments, a memory medium and/or a database may store user history 332.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A primary information handling system for selecting a secondary information handling system for a game, the primary information handling system comprising:
   at least one processor; and
   a memory medium, coupled to the at least one processor, that stores instructions executable by the at least one processor, which when executed by the at least one processor, cause the primary information handling system to:
      receive, from a user, first user input that indicates a selection of a game;
      determine one or more numerical values respectively associated with one or more attributes associated with the game;
      determine a plurality of secondary information handling systems operable for the user to play the game, wherein each secondary information handling system of the plurality of secondary information handling systems is communicatively coupled to the primary information handling system by at least one network;
      determine a plurality of numerical experience scores, comprising, for each secondary information handling system of the plurality of secondary information handling systems:
         communicate with the secondary information handling system to determine a numerical hardware score based at least on one or more components of the secondary information handling system and based at least on utilization of the one or more components of the secondary information handling system;
         communicate with a network to determine a numerical network score based on one or more of an available data bandwidth, a latency of the network and a bandwidth history at a location of the secondary information handling system;
         access historical data stored in the memory medium to determine a numerical preference score based on one or more of historical user preferences and location-based historical user preferences; and
         determine a numerical experience score for the secondary information handling system based at least on the numerical hardware score, the numerical network score, and the numerical preference score;
      rank the plurality of secondary information handling systems by respective numerical experience scores; and
      select at least one of the plurality of secondary information handling systems based at least on a ranking of the plurality of secondary information handling systems by the respective numerical experience scores and based at least on the one or more numerical values respectively associated with the one or more attributes associated with the game.

2. The primary information handling system of claim 1, wherein the instructions further cause the primary information handling system to:
   display, to the user, the ranking of the plurality of secondary information handling systems;
   receive, from the user, second user input that indicates a selection of a secondary information handling system of the plurality of secondary information handling systems; and
   record the second user input that indicates the selected secondary information handling system in the memory medium.

3. The primary information handling system of claim 1, wherein, to determine the numerical hardware score, the instructions further cause the primary information handling system to:
   determine a first numerical value associated with an estimate of a performance of the game on the secondary information handling system based on the one or more components of the secondary information handling system; and
   determine a second numerical value associated with the performance of the game on the secondary information handling system based at least on the utilization of the one or more components of the secondary information handling system;
wherein, to determine the numerical network score, the instructions further cause the primary information handling system to:
   determine a third numerical value associated with an ability to stream data based at least on the available data bandwidth; and
   determine a fourth numerical value associated with the ability to stream the data based at least on a history at the location of the secondary information handling system;
wherein, to determine the numerical preference score, the instructions further cause the primary information handling system to:
   determine a fifth numerical value associated with a user preference based at least on a history associated with the user; and
   determine a sixth numerical value associated with a user preference based at least on a history associated with the user at a location of the user; and
wherein the numerical hardware score is based at least on the first numerical value and based at least on the second numerical value, the numerical network score is based at least on the third numerical value and based at least on the fourth numerical value, and the numerical preference score is based at least on the fifth numerical value and based at least on the sixth numerical value.

4. The primary information handling system of claim 1, wherein the location of the secondary information handling system includes a physical location of the secondary information handling system.

5. The primary information handling system of claim 1, wherein the location of the secondary information handling system includes a network location of the secondary information handling system.

6. The primary information handling system of claim 1, wherein the plurality of secondary information handling systems includes at least one of a desktop computer system, a laptop computer system, a tablet computing device, a personal digital assistant, a gaming console, an electronic music player, an electronic video player, and a wireless telephone.

7. The primary information handling system of claim 1, wherein the one or more numerical values respectively associated with the one or more attributes associated with the game include at least one of a minimum numerical processor throughput value, a minimum numerical bandwidth value, a minimum numerical graphic processor unit throughput value, and a numerical value associated with a graphics intensity of the game.

8. A method, comprising:
receiving, from a user, first user input that indicates a selection of a game;
determining one or more numerical values respectively associated with one or more attributes associated with the game;
determining a plurality of secondary information handling systems operable for the user to play the game, wherein each secondary information handling system of the plurality of secondary information handling systems is communicatively coupled to a primary information handling system by at least one network;
determining a plurality of numerical experience scores for each secondary information handling system, comprising:
communicating with the secondary information handling system to determine a numerical hardware score based on one or more components of the secondary information handling system and utilization of the one or more components of the secondary information handling system;
communicating with a network to determine a numerical network score based at least on available data bandwidth and based at least on a bandwidth history at a location of the secondary information handling system;
accessing a memory medium to determine a numerical preference score based at least on historical user preferences and based at least on location-based historical user preferences; and
determining a numerical experience score for the secondary information handling system based at least on the numerical hardware score, the numerical network score, the numerical preference score, and the one or more numerical values respectively associated with the one or more attributes associated with the game;
ranking the plurality of secondary information handling systems by respective numerical experience scores; and
selecting at least one of the plurality of secondary information handling systems based at least on the ranking of the plurality of secondary information handling systems by the respective numerical experience scores and based at least on the one or more numerical values respectively associated with the one or more attributes associated with the game.

9. The method of claim 8, further comprising:
displaying, to the user, the ranking of the plurality of secondary information handling systems;
receiving, from the user, second user input that indicates a selection of a secondary information handling system of the plurality of secondary information handling systems; and
recording the second user input that indicates selected secondary information handling system in a memory medium.

10. The method of claim 8,
wherein the determining the numerical hardware score includes:
determining a first numerical value associated with an estimate of a performance of the game on the secondary information handling system based on the one or more components of the secondary information handling system; and
determining a second numerical value associated with the performance of the game on the secondary information handling system based at least on the utilization of the one or more components of the secondary information handling system;
wherein the determining the numerical network score includes:
determining a third numerical value associated with an ability to stream data based at least on the available data bandwidth; and
determining a fourth numerical value associated with the ability to stream the data based at least on a history at the location of the secondary information handling system;
wherein the determining the numerical preference score includes:
determining a fifth numerical value associated with a user preference based at least on a history associated with the user; and
determining a sixth numerical value associated with a user preference based at least on a history associated with the user at a location of the user; and
wherein the numerical hardware score is based at least on the first numerical value and based at least on the second numerical value, the numerical network score is based at least on the third numerical value and based at least on the fourth numerical value, and the numerical preference score is based at least on the fifth numerical value and based at least on the sixth numerical value.

11. The method of claim 8, wherein the location of the secondary information handling system includes a physical location of the secondary information handling system.

12. The method of claim 8, wherein the location of the secondary information handling system includes a network location of the secondary information handling system.

13. The method of claim 8, wherein the plurality of secondary information handling systems includes at least one of a desktop computer system, a laptop computer system, a tablet computing device, a personal digital assistant, a gaming console, an electronic music player, an electronic video player, and a wireless telephone.

14. The method of claim 8, wherein the one or more numerical values respectively associated with the one or more attributes associated with the game include at least one of a minimum numerical processor throughput value, a minimum numerical bandwidth value, a minimum numerical graphic processor unit throughput value, and a numerical value associated with a graphics intensity of the game.

15. A computer-readable non-transitory memory medium that includes instructions that, when executed by at least one processor of a primary information handling system, cause the primary information handling system to:
receive, from a user, first user input that indicates a selection of a game;
determine one or more numerical values respectively associated with one or more attributes associated with the game;
determine a plurality of secondary information handling systems operable for the user to play the game, wherein each secondary information handling system of the plurality of secondary information handling systems is communicatively coupled to the primary information handling system by at least one network;
for each secondary information handling system of the plurality of secondary information handling systems:
communicate with the secondary information handling system to determine a numerical hardware score based on one or more components of the secondary information handling system and based at least on utilization of the one or more components of the secondary information handling system;
communicate with a network to determine a numerical network score based at least on available data bandwidth and based at least on a bandwidth history at a location of the secondary information handling system;
access the memory medium to determine a numerical preference score based at least on historical user preferences and based at least on location-based historical user preferences; and
determine a numerical experience score for the secondary information handling system based at least on the numerical hardware score, the numerical network score, and the numerical preference score;
rank the plurality of secondary information handling systems by respective numerical experience scores; and
select at least one of the plurality of secondary information handling systems based at least on a ranking of the plurality of secondary information handling systems by the respective numerical experience scores and based at least on the one or more numerical values respectively associated with the one or more attributes associated with the game.

16. The computer-readable non-transitory memory medium of claim 15, wherein the instructions further cause the primary information handling system to:
display, to the user, the ranking of the plurality of secondary information handling systems;
receive, from the user, second user input that indicates a selection of a secondary information handling system of the plurality of secondary information handling systems; and
record the second user input that indicates the selected secondary information handling system.

17. The computer-readable non-transitory memory medium of claim 15,
wherein, to determine the numerical hardware score, the instructions further cause the primary information handling system to:
determine a first numerical value associated with an estimate of a performance of the game on the secondary information handling system based at least on the one or more components of the secondary information handling system; and
determine a second numerical value associated with the performance of the game on the secondary information handling system based at least on the utilization of the one or more components of the secondary information handling system;
wherein, to determine the numerical network score, the instructions further cause the primary information handling system to:
determine a third numerical value associated with an ability to stream data based at least on the available data bandwidth; and
determine a fourth numerical value associated with the ability to stream the data based at least on a history at the location of the secondary information handling system;
wherein, to determine the numerical preference score, the instructions further cause the system to:
determine a fifth numerical value associated with a user preference based at least on a history associated with the user; and
determine a sixth numerical value associated with a user preference based at least on a history associated with the user at a location of the user; and
wherein the numerical hardware score is based at least on the first numerical value and based at least on the second numerical value, the numerical network score is based at least on the third numerical value and based at least on the fourth numerical value, and the numerical preference score is based at least on the fifth numerical value and based at least on the sixth numerical value.

18. The computer-readable non-transitory memory medium of claim 15, wherein the location of the secondary information handling system includes a physical location of the secondary information handling system.

19. The computer-readable non-transitory memory medium of claim 15, wherein the location of the secondary information handling system includes a network location of the secondary information handling system.

20. The computer-readable non-transitory memory medium of claim 15, wherein the one or more numerical values respectively associated with the one or more attributes associated with the game include at least one of a minimum numerical processor throughput value, a minimum numerical bandwidth value, a minimum numerical graphic processor unit throughput value, and a numerical value associated with a graphics intensity of the game.

\* \* \* \* \*